Dec. 7, 1926.　　　　　　　　　　　　　　　　1,609,850
C. T. WEYMANN
CLOSED ROAD MOTOR VEHICLE BODY
Filed March 26, 1925　　　2 Sheets-Sheet 1
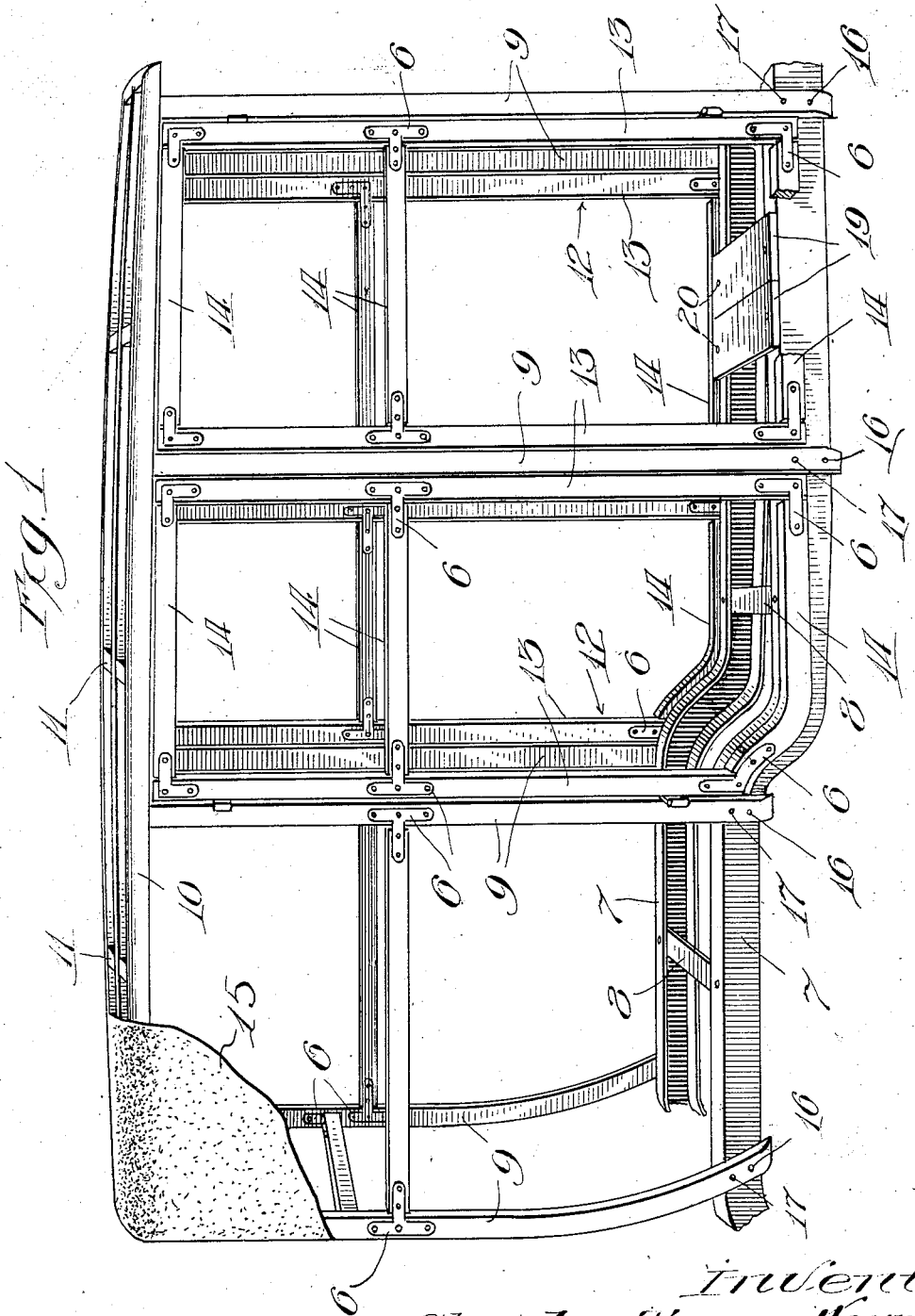

Dec. 7, 1926.
C. T. WEYMANN
1,609,850
CLOSED ROAD MOTOR VEHICLE BODY
Filed March 26, 1925  2 Sheets-Sheet 2
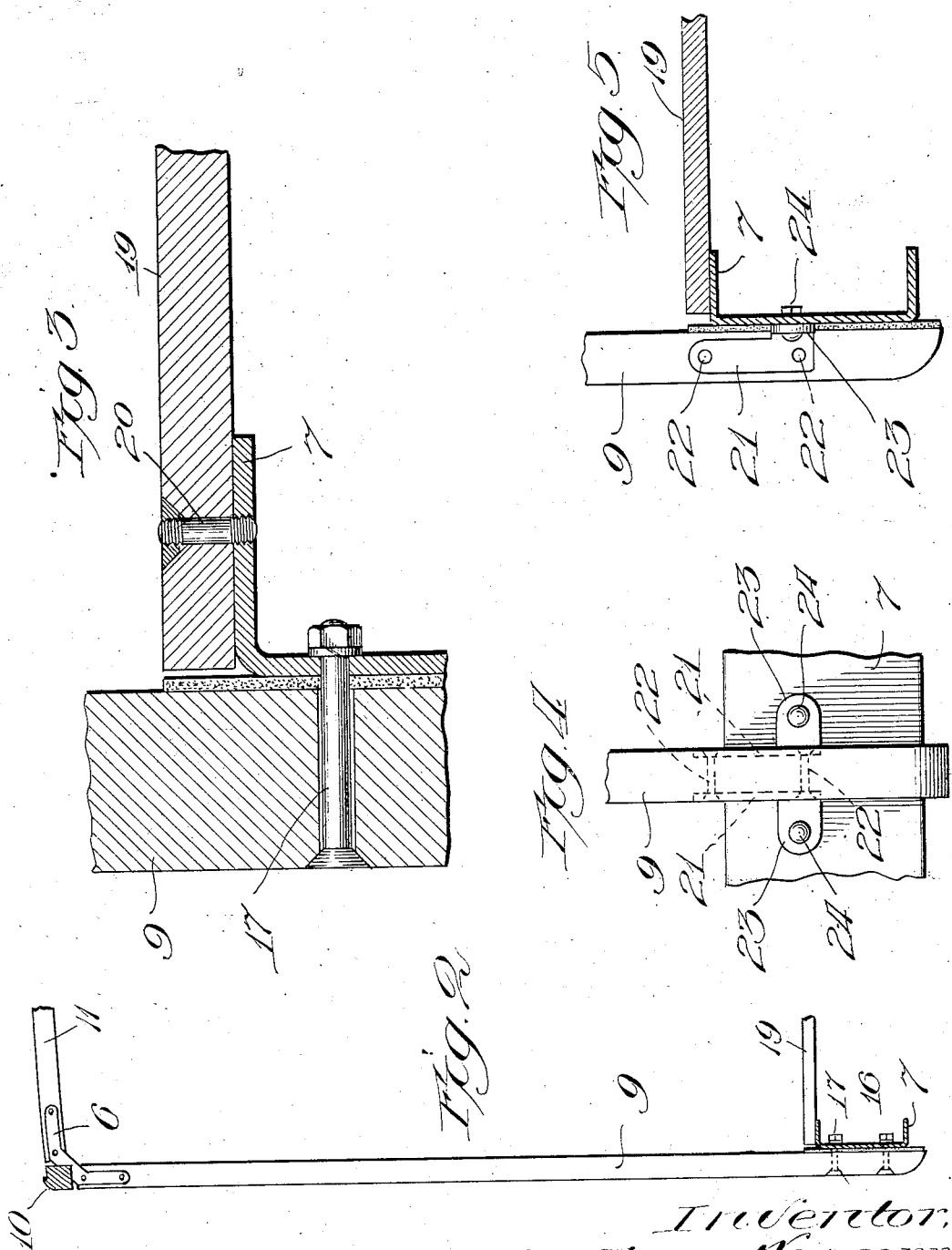
Inventor;
Charles Terres Weymann
by Rector, Hibben, Davis and Macauley
Attys Patented Dec. 7, 1926.

1,609,850

UNITED STATES PATENT OFFICE.

CHARLES TERRES WEYMANN, OF PARIS, FRANCE.

CLOSED ROAD-MOTOR-VEHICLE BODY.

Application filed March 26, 1925. Serial No. 18,342.

This invention relates to closed bodies for road motor vehicles, and more particularly to the Weymann type of closed body which is designed and adapted to weave or flex with the chassis frame. In my U. S. Letters Patent No. 1,519,093, granted to me December 9, 1924, I have shown the vertical posts of my flexible body skeleton as being yieldingly mounted at their lower ends on the ends of cross-pieces extending transversely of, and adapted to be secured to, the side sills of the chassis frame. The principal objects of the present invention are to cheapen the cost of manufacture and simplify the construction and assembly of bodies of this type and with these ends in view, I have dispensed with the transverse supporting pieces, shown in my aforesaid patent, and have secured the lower ends of the vertical posts of the body skeleton directly to the side sills of the chassis frame in such a manner that the posts, due to the weaving action of the chassis, may move relative to the side sills without contacting with or rubbing against the side sills whereby all creaking or rattle due to friction or movement between the parts is avoided.

With a view to attaining the above objects, and others that will become apparent from the following description, my invention consists in the features of construction and in the combination and arrangement of parts hereinafter set forth and claimed.

In the drawings, Figure 1 is a perspective side view of a body skeleton and chassis frame embodying one form of my invention; Fig. 2 is a vertical cross-section through one side of the body and the side sill; Fig. 3 is an enlarged fragmentary section taken through one of the side sills and the lower end of one of the vertical posts, and Figs. 4 and 5 are detail side and fragmentary sectional views, respectively, showing modified means for securing the lower ends of the vertical posts to the side sills.

The chassis frame may comprise the usual metal channel-shaped side sills 7 connected together by cross beams 8, the chassis frame being supported by springs on the front and rear axles of the motor vehicle.

The skeleton frame of the body comprises the wooden vertical posts 9 on each side of the body, and the roof structure consisting of the longitudinal side rails 10 and the cross bows 11. The parts of the body skeleton, including the vertical posts 9, the top rails 10 and the transverse bows 11, as well as arm rails and other parts, are yieldingly connected together by the well-known form of Weymann joint, which consists of flexible metal brackets 6 secured to the pieces by bolts or rivets so that the parts may move or flex relative to each other as the body weaves or flexes with the chassis frame. The frames of the doors 12 comprise the vertical pieces 13 and the horizontal cross-pieces 14 likewise connected together by Weymann joints to permit them to flex. The body skeleton is covered by a flexible covering such as fabric, leather or the like. Only a fragment of this covering 15 is shown in Fig. 1.

In the form of embodiment of my invention shown in Figs. 1, 2 and 3, the lower ends of the vertical posts 9 extend down along the outside of the vertical webs of the side sills and are secured directly thereto by means of bolts 16, there being two bolts for each post. Between the posts and the side sills I insert a strip or layer of resilient material, such as felt or rubber, in order to separate the posts from the side sills and thereby avoid creaking or rattle between the parts when they move relative to each other. One of the holes through which the bolt 17 projects is slightly larger than the other so that the one bolt acts as an axis about which the post may move or swing slightly while the other bolt may tend to limit the extent of movement of the post. It will thus be seen that the lower ends of the posts are yieldingly connected to the chassis frame, so that they may move slightly relative thereto in order to accommodate the weaving action of the body in synchronism with the weaving of the chassis frame. It is obvious that this construction is extremely cheap to manufacture and yet efficient in function and lends itself readily to the assembly of the body directly on the chassis frame.

The floor boards 19 (Fig. 3) are supported on and secured by means of bolts 20 directly to the top flanges of the side sills and this floor structure is entirely independent of the body, being out of contact with all parts of the body.

In the modification shown in Figs. 4 and 5, each of the posts, at their lower ends, is connected to the chassis frame by means of thin sheet metal brackets 21 having vertical portions connected to the lower ends of the posts by means of two bolts 22, and laterally extending ears 23 which are secured to the vertical webs of the side sills by single bolts or rivets 24. In this form of embodiment also I employ the spacing layers of felt or other resilient material between the posts and the side sills.

I claim:

1. In a road motor vehicle, the combination of a chassis having side sills, a closed body skeleton constructed to weave with the chassis frame and comprising vertical wooden posts, a roof structure formed of longitudinal and transverse wooden pieces, and means for yieldingly connecting together the tops of the posts and the wooden pieces of the roof, flexible paneling for covering the body skeleton, and means for directly securing the lower ends of the posts to the side sills but slightly out of contact therewith.

2. In a road motor vehicle, the combination of a chassis having side sills, a closed body skeleton constructed to weave with the chassis frame and comprising vertical wooden pieces, a roof structure formed of longitudinal and transverse wooden pieces, and means for yieldingly connecting together the tops of the posts and the wooden pieces of the roof, flexible paneling for covering the body skeleton, means for directly and yieldingly securing the lower ends of the posts to the side sills, and resilient material between the lower ends of the posts and the side sills.

3. In a road motor vehicle, the combination of a chassis having side sills, a closed body skeleton constructed to weave with the chassis frame and comprising vertical wooden posts, a roof structure formed of longitudinal and transverse wooden pieces, and means for yieldingly connecting together the tops of the posts and the wooden pieces of the roofs, flexible paneling for covering the body skeleton, and two bolts projecting through the lower end of each of the vertical posts and the side sill of the chassis frame, one of said bolts projecting through an opening of larger diameter and the other serving as an axis about which each of said posts may move.

4. In a road motor vehicle, the combination of a chassis having side sills, a closed body skeleton constructed to weave with the chassis frame and comprising vertical wooden posts, a roof structure formed of longitudinal and transverse wooden pieces, and means for yieldingly connecting together the tops of the posts and the wooden pieces of the roofs, flexible paneling for covering the body skeleton, two bolts projecting through the lower end of each of the vertical posts and the side sill of the chassis frame, one of said bolts projecting through an opening of larger diameter and the other serving as an axis about which each of said posts may move, and resilient material positioned between the lower ends of the posts and the side sills.

5. In a road motor vehicle, the combination of a chassis having side sills, a closed body skeleton comprising vertical posts and a roof structure mounted on the upper ends along the sides of the side sills, means for securing the lower end of said posts to the side sills, resilient material between the lower ends of the posts and the side sills to maintain the same out of contact, and a floor mounted directly on the side sills and entirely independent of the body.

CHARLES TERRES WEYMANN.